May 30, 1967 R. J. BOEDIGHEIMER 3,322,462
BELT GRIPPER
Filed Jan. 2, 1964
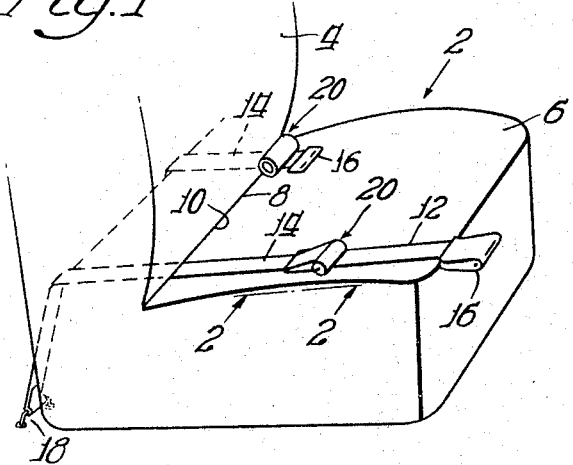
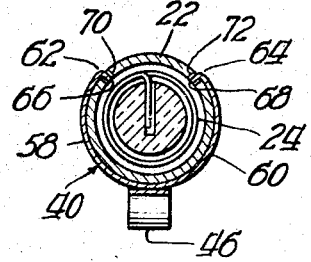
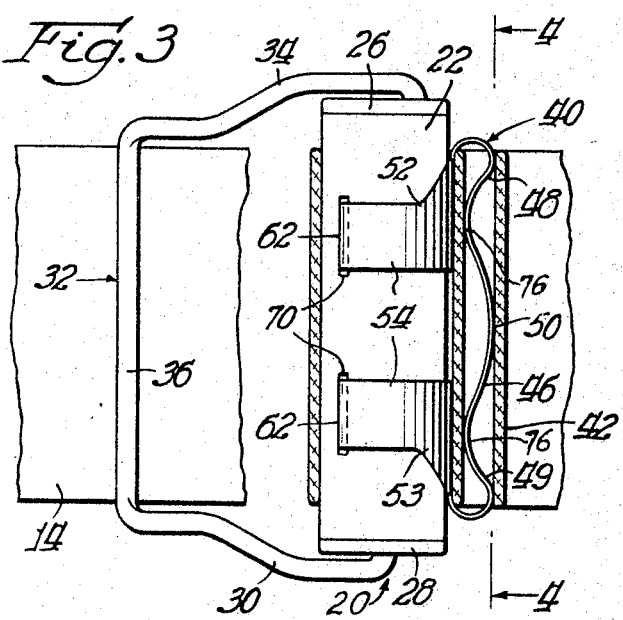
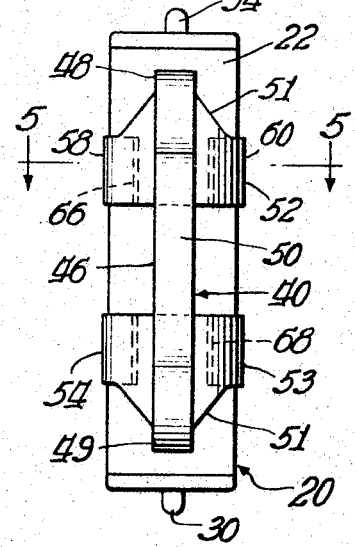
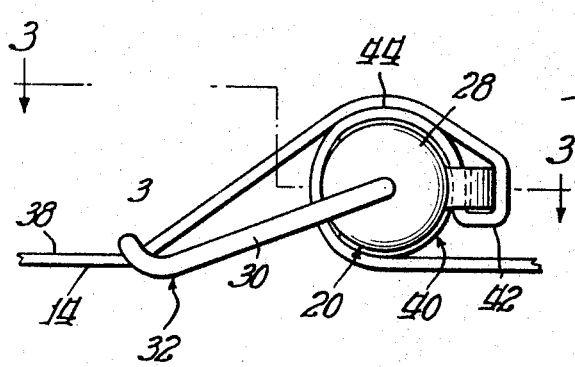
Inventor:
Raymond J. Boedigheimer
By Richard J. Myers Atty.

United States Patent Office 3,322,462
Patented May 30, 1967

3,322,462
BELT GRIPPER
Raymond J. Boedigheimer, Chicago, Ill., assignor to Borg-Warner Corporation, Chicago, Ill., a corporation of Illinois
Filed Jan. 2, 1964, Ser. No. 341,474
13 Claims. (Cl. 297—388)

This invention relates to a belt gripper or clamp means and in particular to a belt gripper or clamp means for a seat belt retractor of the reel type wherein the gripper holds the belt on the barrel of the retractor mechanism of the reel type.

It is therefore a general object of this invention to provide a belt gripper or clamp means to hold a belt on a belt retractor mechanism.

It is another object of this invention to provide a releasable or removable belt gripper for holding a vehicle safety seat belt on a seat belt retractor mechanism of the reel type having a barrel containing a winding means or spring connected with a reaction arm engaging the belt wherein the retractor mechanism coils the belt around the clamp means and the barrel.

It is another object of this invention to provide a removable belt gripper that can be tumbled apart from the retractor mechanism to remove all sharp edges from the gripper so that the belt will not become frayed or cut.

It is another object of this invention to provide a belt gripper having two belt gripping portions for even gripping action.

It is another object of this invention to provide a belt gripper for a seat belt reel wherein the gripper is a spring element which can hold various thickness of belt securely and allow adjustment of the reel on the seat belt.

It is still another object of this invention to provide a gripper for a seat belt retractor of the reel type which prevents the gripper parts from crushing the barrel or spring of the retractor.

These and other objects will become apparent from reference to the following description and drawings wherein:

FIGURE 1 is a perspective view of a vehicle seat structure employing a seat belt with belt retractor mechanisms;

FIGURE 2 is a view taken along line 2—2 of FIGURE 1;

FIGURE 3 is a view partly in section taken along line 3—3 of FIGURE 2;

FIGURE 4 is a view taken along line 4—4 of FIGURE 3; and

FIGURE 5 is a sectional view taken along line 5—5 of FIGURE 4.

With reference now to FIGURE 1 of the drawings, there is shown a vehicle seat structure 2 have a back rest 4 and a horizontal seat part 6 joining with the back rest 4 at juncture 8 defined by an opening 10 which allows a seat belt structure 12 to extend therethrough. The belt structure 12 comprises a pair of belt lengths 14, 14 one of which is retracted on the seat part 6 and the other of which is extended on the seat part 6. Each belt length 14 has at its forward free end a couple element 16 to be fastened to the other belt length when placed about the user's waist and each belt length at its rear anchored end on the otherside of the juncture 8 has a floor anchor 18 for attaching the belt length to the vehicle floor. A retractor unit 20 of the reel type is clamped on to each belt length 14 for allowing the extension or contraction of the safety seat belt length from or about the retractor unit 20.

The retractor or roll-up device 20, as shown in the drawings and in enlarged view in FIGURES 2 through 5, comprises a tubular member or a barrel 22 in which is contained a helical spring 24. One end of the spring 24 is drivingly connected to a rotatable driver plug 26 extending in the tubular member or reel 22 and the other end of the spring 24 is connected to a barrel anchor plug 28 extending in the barrel fixedly connected to the barrel 22. The anchor plug 28 has an outer bore in which rotates arm part 30 of the reaction member or bale 32. The driver plug 26 has an outer groove receiving arm part 34 whereby plug 26 is constrained for motion with arm part 34 of the reaction member 32. The reaction arm 32 has a transverse or cross arm part 36 which engage the flat side 38 of the belt length 14. This flat side 38 is the same side the barrel 22 rests on when the belt length 14 is extended. Removable clamp means or belt gripper 40 is provided on the barrel 22 and the bight portion 42 of the belt length 14 extends around the clamp means. Thus it is seen that the belt length is contacted by the reaction arm 32, the barrel 22, and the clamp means 40. The spring 24 may be wound by moving the reaction arm 32 relative to the barrel 22 a sufficient amount, placed on the belt length 14 as shown and the clamp means snapped over the belt length 14 (at bight 42). Then when the barrel and reaction arm are released, the belt length will roll up on the barrel or tubular member into a double ply superimposed coil 44 of belt length 14. The belt length 14 may be unravelled by grasping the free end of the belt length and extending the belt length until it is fully extended and where retractor 20 is merely carried on the belt length completely out of the line of pull or force exerted on the belt length 14 such as when placed about a user or vehicle occupant who is being urged forward in a vehicle that is slowing down. The construction and operation of the retractor device is shown in co-pending U.S. application having Ser. No. 274,271 and filing date of Apr. 19, 1963 with the exception of construction and mounting of the releasable clamp means hereinafter described.

The removable clamp means or structure or belt gripper 40 comprises an elongated central part or double grip part or bar 46 which in elevation is thin sheet material that is resilient or spring-like, such as thin spring steel, and has a curved or U-shaped section or belt clip part 48 or 49 at each end and an intermediate upwardly bowed section 50 that is continuous with each end section (see FIGURE 3). The end sections 48, 49 extend up further than the bowed section 50 and they also extend somewhat diagonally outward diverging away from one another. The end of each section 48 or 49 join with a respective outer end part 51 of each C-shaped clasp or clip 52 of thin resilient sheet like material. The plan view (see FIGURE 4) of the two clasps or spring clips 52, 53 show each clasp or spring clip to have a generally triangular shaped end part 51, the apex of which joins with the respective section 48 or 49 and the base of which merges with the somewhat rectangular shaped open ring portion 54 of each clasp part 52 or 53. In FIGURE 4, it is seen that the bar or dual belt grip 46 extends over the spaced apart clasps or clips 52, 53 and connects with the clasps to form a unitary clamp structure or belt gripper of resilient sheet material, such as spring steel. Each clasp in cross section (see FIGURE 5) defines a C-shaped portion 54 that is slightly larger than a semi-circle, each clasp having a pair of finger portions 58, 60 that clasp or clip about the cylindrical barrel 22, the outer free ends 62, 64 of the fingers 58, 60 defining a space or opening between them. Each end 62, 64 has a tab or projection or arm 66 or 68 directed radially inwardly at somewhat right angles to the respective fingers 58, 60. These tabs 66, 68 extend into respective openings or slots 70, 72 in the tubular member 22.

This clamp means or belt gripper of this spring steel is formed to a configuration that gives two spring belt gripper sections 76, 76 or parts that can grasp the belt length 14 as defined by the bowed section 50 and each end U-shaped section 48 or 49. These gripper parts 76, 76 extend over each clip part 52, 53 such that the belt length 14 is clasped tightly between a respective spring gripper section 76 and a clip part 52 or 53.

The gripper structure 40 is capable of being attached to and from the belt length by flexing of the finger portions 58, 60 with the insertion or removal of projections 66 or 68 from the apertures 70, 72 of the barrel 22. The gripper structure 40 can be made smooth by a tumbling process and then attached a belt that heretofore would be frayed by a unitary gripper and reel device which could not be properly tumbled to remove burrs from the gripper portion. The double gripper parts of the unit 40 afford even clasping action on the barrel and the belt without a particular regard to the thickness of the belt. The gripper parts 76, 76 not being punched out from the barrel do not leave openings in the barrel to allow the gripper parts to enter and harm the spring.

While only particular embodiments of the invention have been described and illustrated, it is apparent that modifications and alterations may be made thereon. It is therefore the intention in the appended claims to cover all such modifications and alterations as may fall within the true spirit and scope of the invention.

What is claimed is:

1. A belt gripper means for attachment of a seat belt to a seat belt retractor of the reel type whereby the belt is rolled up on the retractor in a double ply superimposed coil, said gripper means comprising an elongated bar portion adapted to be disposed longitudinally of the reel, a pair of resilient belt clip portions superimposed in longitudinally spaced relation over the bar portion in close proximity thereto and defining therewith a pair of a belt engaging and grasping means, and a pair of clasp portions depending in longitudinally spaced relation under the clip portion and from the bar portion and having reel fastening means adapted to secure the clasp portions on the reel.

2. A belt gripper means for attachment of a seat belt to a seat belt retractor of the reel type whereby the belt is rolled up on the reel in a coil, said gripper means comprising an elongated resilient clamping part adapted to be disposed longitudinally of the reel, a resilient belt clip part connected with the clamping part and having a curved portion extending over and in close proximity with the clamping part to define a belt engaging and grasping means, and a resilient clasp part connected with the clamping part and depending there-beneath and having a reel fastening means adapted to secure the clasp part on the reel.

3. A belt gripper means for attachment of a seat belt to a seat belt retractor of the reel type whereby the belt is rolled up on the retractor in a coil, said gripper means comprising an elongated resilient clamping part adapted to be disposed longitudinally of the reel, a resilient belt clip part connected with the clamping part and having a curved portion extending over and in close proximity with the clamping part to define a belt engaging and grasping means, and a clasp part connected with the clamping part and depending there-beneath and having a reel fastening means adapted to secure the clasp part on the reel, said clasp part having a pair of curved finger portions defining a C-shaped element adapted for embracement about the reel.

4. The invention according to claim 3 and said fastening means comprising an end extension of each finger, each extension being in the form of a projection directed radially inward from its respective finger portion toward the other projection and adapted for reception in an associated aperture in the reel.

5. A belt gripper means for attachment of a seat belt to a seat belt retractor of the reel type whereby the belt is rolled up on the retractor in a coil, said gripper means comprising a clamping part adapted to be disposed longitudinally of the reel, a belt clip part associated in close proximity with the clamping part to define a belt engaging and grasping means, and a clasp part associated with the clamping part and having a reel fastening means adapted to secure the clasp part on the reel.

6. A removable belt gripper for attachment of a seat belt to a seat belt retractor of the reel type, said gripper comprising an elongated belt clip adapted to be disposed longitudinally over the reel, said belt clip having an undersurface and oversurface adapted for engagement with the belt between the surfaces and having a pair of opposed resilient clamp end portions in the form of fastening means adapted to be received by an associated end portion of the reel.

7. A belt gripper for attachment of a seat belt to a seat belt retractor of the reel type and comprising a resilient belt clip part having a pair of spaced apart end sections each having a belt contact surface, an intermediate section connected with the end sections and spaced above the belt contact surfaces, a pair of spaced apart reel clasp parts, each clasp part being connected with a respective end section and having a belt engaging surface facing a belt contact surface of a respective end section, each clasp defining a C-shaped reel engaging portion having a pair of interconnected curved finger means disposed under a respective end section, each finger means embracing the reel and having an end projection directed radially inwardly and adapted for engagement in an associated aperture in the reel.

8. A belt gripper for attachment of a seat belt to a seat belt retractor of the reel type and comprising a resilient belt clip part having a pair of spaced apart end sections each having a belt contact surface, a pair of spaced apart reel clasp parts, each clasp part being connected with a respective end section and having a belt engaging surface facing a belt contact surface of a respective end section, each clasp defining a C-shaped reel engaging portion having a pair of interconnected curved finger means disposed under a respective end section, each finger means embracing the reel and having an end projection directed radially inwardly and adapted for engagement in an associated aperture in the reel.

9. A safety belt retractor mechanism of the reel type whereby the belt is rolled up on the retractor in a coil comprising a tubular reel, a belt reaction member rotatively connected with the tubular reel and having a belt engaging portion extending outwardly therefrom, energy storing means disposed with the tubular reel and operatively connected with the tubular reel and the reaction member to rotate one relative to the other, a removable belt gripper means disposed on the reel radially inwardly of the belt engaging portion of the reaction member, said gripper means comprising an elongated bar portion adapted to be disposed longitudinally of the reel, a pair of resilient belt clip portions superimposed in longitudinally spaced relation over the bar portion in close proximity thereto and defining therewith a pair of a belt engaging and grasping means, and a pair of clasp portions depending in longitudinally spaced relation under the clip portion and from the bar portion and having reel fastening means and said reel being provided with means receiving the fastening means in securing the clasp portions on the reel.

10. A safety belt retractor mechanism of the reel type whereby the belt is rolled up on the retractor in a coil comprising a tubular reel, a belt reaction member rotatively connected with the tubular reel and having a belt engaging portion extending outwardly therefrom, energy storing means disposed with the tubular reel and operatively connected with the tubular reel and the reaction member to rotate one relative to the other, a removable belt gripper means disposed on the reel radially inwardly of the belt engaging portion of the reaction member, said gripper means comprising an elongated resilient clamping part adapted to be disposed longitudinally of the reel, a resilient belt clip part connected with the clamping part and having a curved portion extending over and in close proximity with the clamping part to define a belt engaging and grasping means, and a resilient clasp part connected with the clamping part and depending there-beneath and having a reel fastening means and said reel being provided with means receiving the fastening means in securing the clasp part on the reel.

11. A safety belt retractor mechanism of the reel type whereby the belt is rolled up on the retractor in a coil comprising a tubular reel, a belt reaction member rotatively connected with the tubular reel and having a belt engaging portion extending outwardly therefrom, energy storing means disposed with the tubular reel and operatively connected with the tubular reel and the reaction member to rotate one relative to the other, a removable belt gripper means disposed on the reel radially inwardly of the belt engaging portion of the reaction member, said gripper means comprising a clamping part adapted to be disposed longitudinally of the reel, a belt clip part associated in close proximity with the clamping part to define a belt engaging and grasping means, and a clasp part associated with the clamping part and having a reel fastening means and said reel being provided with means receiving the fastening means in securing the clasp part on the reel.

12. A safety belt retractor mechanism of the reel type whereby the belt is rolled up on the retractor in a coil comprising a tubular reel, a belt reaction member rotatively connected with the tubular reel and having a belt engaging portion extending outwardly therefrom, energy storing means disposed with the tubular reel and operatively connected with the tubular reel and the reaction member to rotate one relative to the other, a removable belt gripper means disposed on the reel radially inwardly of the belt engaging portion of the reaction member, said gripper means comprising an elongated belt clip adapted to be disposed longitudinally over the reel, said clip having an undersurface adapted for engagement with the belt and having a pair of opposed end portions in the form of fastening means and said reel being provided with means operatively connecting with the fastening means.

13. A safety belt retractor mechanism of the reel type whereby the belt is rolled up on the retractor in a coil comprising a tubular reel, a belt reaction member rotatively connected with the tubular reel and having a belt engaging portion extending outwardly therefrom, energy storing means disposed with the tubular reel and operatively connected with the tubular reel and the reaction member to rotate one relative to the other, a removable belt gripper means disposed on the reel radially inwardly of the belt engaging portion of the reaction member, said gripper means comprising a resilient belt clip part having a pair of spaced apart end sections each having a belt contact surface, a pair of spaced apart reel clasp parts, each clasp part being connected with a respective end section and having a belt engaging surface facing a belt contact surface of a respective end section, each clasp defining a C-shaped reel engaging portion having a pair of interconnected curved finger means disposed under a respective end section, each finger means embracing the reel and having an end projection directed radially inwardly and said reel having a respective aperture receiving a respective projection.

References Cited
UNITED STATES PATENTS

| | | | |
|---|---|---|---|
| 821,117 | 5/1906 | Olmsted | 242—74.2 |
| 1,048,270 | 12/1912 | Aughinbaugh | 242—74.2 |
| 1,105,542 | 7/1914 | Tobie | 24—259.1 |
| 1,783,840 | 12/1930 | Goeller | 24—81 |
| 2,033,905 | 3/1936 | Kingsley | 242—74.2 |
| 2,979,282 | 4/1961 | Barecki | 297—388 X |
| 3,074,761 | 1/1963 | Ryan | 297—388 |

CASMIR A. NUNBERG, *Primary Examiner.*

R. B. FARLEY, *Assistant Examiner.*